United States Patent [19]

Yates et al.

[11] 3,937,660
[45] Feb. 10, 1976

[54] REGENERATION PROCEDURE FOR IRIDIUM-CONTAINING CATALYST

[75] Inventors: David J. C. Yates, Westfield; Walter S. Kmak, Scotch Plains, both of N.J.

[73] Assignee: Exxon Research & Engineering Company, Linden, N.J.

[22] Filed: Aug. 16, 1973

[21] Appl. No.: 388,744

Related U.S. Application Data

[63] Continuation-in-part of Ser. No. 343,304, March 21, 1973, which is a continuation-in-part of Ser. No. 248,683, April 28, 1972.

[52] U.S. Cl. .................. 208/140; 252/415
[51] Int. Cl.² .................. C10G 35/08; B01J 23/96
[58] Field of Search .............. 352/415; 208/140

[56] References Cited
UNITED STATES PATENTS

| | | | |
|---|---|---|---|
| 2,880,168 | 3/1959 | Feller | 208/140 |
| 2,980,631 | 4/1961 | Craig et al. | 208/139 |
| 3,134,732 | 5/1964 | Kearby et al. | 208/140 |
| 3,554,902 | 1/1971 | Buss | 208/139 |
| 3,578,583 | 5/1971 | Buss | 208/139 |
| 3,625,860 | 12/1971 | Condrasky | 252/415 |
| 3,637,524 | 1/1972 | Johnson et al. | 252/415 |
| 3,673,109 | 6/1972 | Georgescu et al. | 252/415 |
| 3,684,693 | 8/1972 | Sinfelt | 208/138 |
| 3,707,509 | 12/1972 | Georgescu et al. | 208/139 |
| 3,764,557 | 10/1973 | Kluksdahl | 252/415 |

Primary Examiner—Winston A. Douglas
Assistant Examiner—P. E. Konopka
Attorney, Agent, or Firm—J. E. Luecke; J. W. Ditsler

[57] ABSTRACT

Supported iridium-containing hydrocarbon conversion catalysts which are at least partially deactivated due to the deposition of carbonaceous residues thereon during contact with hydrocarbons are regenerated by (1) contacting the catalyst with oxygen to burn at least a portion of the carbonaceous residues from the catalyst, (2) contacting the carbonaceous residue-depleted catalyst with hydrogen at an elevated temperature to convert a substantial portion of the iridium present in the catalyst to its metallic form, (3) contacting the reduced catalyst with an elemental halogen-containing gas at a temperature of at least about 300°C., and (4) repeating steps (2) and (3), in sequence, at least one additional time to thereby redisperse the iridium catalyst component to a highly active, high surface area state.

24 Claims, 2 Drawing Figures

REGENERATION PROCEDURE FOR IRIDIUM-CONTAINING CATALYST

CROSS REFERENCES TO RELATED APPLICATIONS

This application is a continuation-in-part of application Ser. No. 343,304, filed Mar. 21, 1973, which application is a continuation-in-part of application Ser. No. 248,683, filed Apr. 28, 1972.

BACKGROUND OF THE INVENTION

1. Field of the Invention

The present invention relates to a method for regenerating supported iridium-containing hydrocarbon conversion catalysts. More particularly, the present invention relates to a process for regenerating a supported iridium-containing hydrocarbon conversion catalyst that has been at least partially deactivated because of the presence of the iridium in the catalyst in a large crystallite, low surface area form.

2. Description of the Prior Art

The deactivation of noble metal-containing hydrocarbon conversion catalysts due to the deposition on the catalyst of carbonaceous residues is a common refinery problem. Catalyst deactivation is particularly acute with respect to supported noble metal-containing catalysts, such as platinum on alumina, employed in the hydroforming of naphtha feed stocks. Platinum containing reforming catalysts are reactivated or regenerated by burning the coke or carbonaceous residues from the catalyst followed by a redispersion operation whereby the platinum contained on the catalyst, which is agglomerated with loss of surface area during the burning operation, is redispersed by treatment with chlorine, HCl or other halogen providing reagents alone or in combination with oxygen at elevated temperatures. The techniques useable for the reactivation of platinum-containing catalysts are not directly applicable for the redispersion of iridium. Unlike platinum, iridium tends to agglomerate at significant rates to crystallites of low surface area when exposed to oxygen at temperatures in excess of about 350°C. Further, unlike platinum, large iridium and iridium oxide crystallites are not readily redispersed to their high surface area state by a simple chlorine treatment immediately following the burning operation used to remove carbonaceous residues.

Several patents exist, namely U.S. Pat. Nos. 3,134,732 and 3,625,860, that have disclosures that bear a superficial resemblance to the procedure employed herein. The disclosures of the patents, which are primarily directed to techniques for the redispersion of platinum contained in a reforming catalyst, relate to procedures wherein the agglomerated noble metal catalyst substituent is redispersed using a single cycle operation involving a reduction of the catalyst metals followed by chlorine treatment in either a reducing atmosphere or in the presence or absence of oxygen. Such single cycle treatment operations are not as effective as the process of the present invention for redispersing agglomerated iridium and restoring catalyst activity to essentially fresh catalyst levels.

SUMMARY OF THE INVENTION

This invention provides an improved technique for the regeneration or reactivation of supported iridium-containing hydrocarbon conversion catalysts that have been at least partially deactivated by the deposition of carbonaceous residues thereon. The first step of the regeneration sequence comprises contacting the catalyst with a gaseous mixture containing oxygen at a temperature of less than about 600°C. for a time sufficient to burn at least a portion of the carbonaceous residues from the catalyst. While the burning operation has the essential effect of removing the undesirable carbonaceous residues, the burning operation, unless certain precautions are taken, also converts the iridium present in the catalyst to large iridium oxide crystallites which revert to low surface area iridium crystallites on reduction. Further, when iridium is used in conjunction with other metals in a multimetallic catalyst system, the burning operation used to remove carbonaceous residues serves to destroy the highly dispersed polymetallic clusters comprising atoms of iridium and other metals. Accordingly, when the desired polymetallic cluster structure is destroyed by the formation of a separate agglomerated iridium oxide phase, the activity of the catalyst for promoting hydrocarbon conversions is subsequently much lower.

Restoration of high metal surface area and reformation of the desired highly dispersed polymetallic clusters, in the case of a polymetallic system, is achieved, following the burning operation, by contacting the carbonaceous residuedepleted catalyst with a plurality of sequential reduction/halogenation cycles. Each cycle consists of (a) contacting the catalyst with a hydrogen containing gas at an elevated temperature for a time sufficient to convert at least a portion, preferably a substantial portion, of the iridium present in the catalyst to its metallic form and (b) contacting the reduced catalyst with an elemental halogen-containing gas at a temperature of at least about 300°C. A sufficient number of reduction/chlorination cycles are employed to increase the surface area of the iridium metal present on the catalyst to at least 200 square meters per gram ($m^2/gm.$) of iridium as determined by the carbon monoxide chemisorption method described by Yates and Sinfelt, J. Catalysis, 8, 348 (1967).

Figure 1:
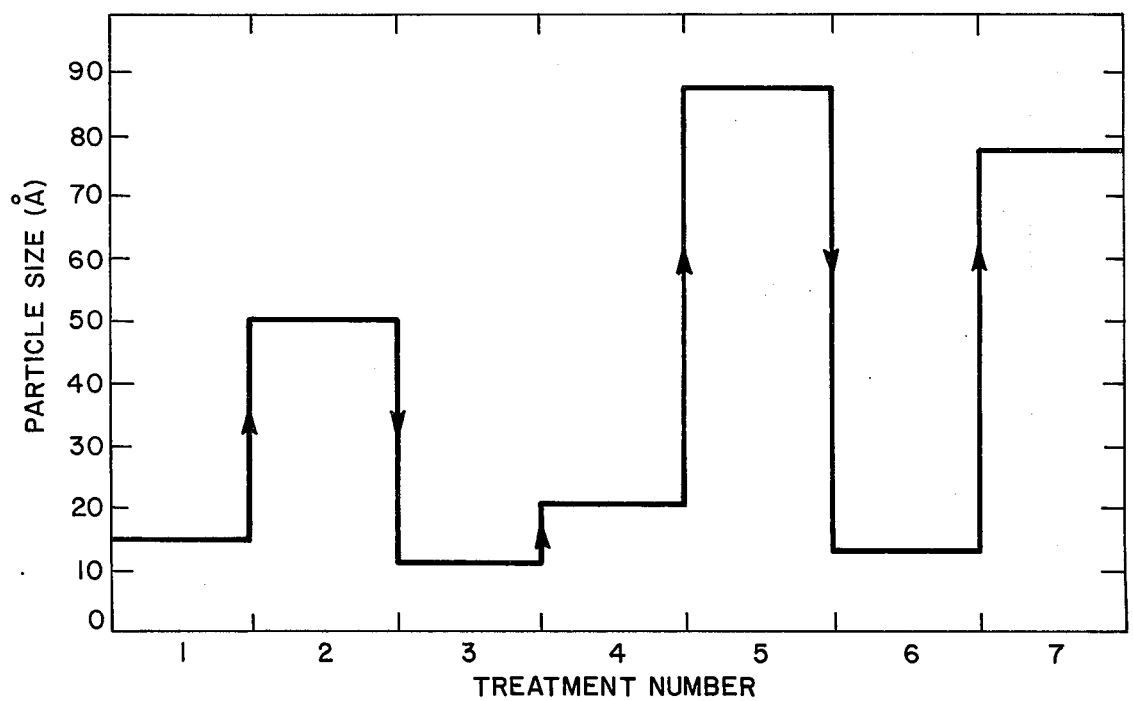
FIGS. 1 and 2 illustrate the effect of various treatment operations described in Example 1 on iridium particle size.

The supported iridium-containing catalyst composites that are regenerated by the process of the present invention comprise a porous carrier or support material in combination with an iridium component and, for certain uses, a halogen component. The support component of the catalyst is preferably a porous, adsorptive material having a surface area, as determined by the Brunauer-Emmett-Teller (BET) method, of about 20 to 800, preferably 100 – 300 square meters per gram. This support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as kieselguhr, kaolin, china clay, Attapulgus clay, etc.; (b) aluminosilicate zeolite materials such as naturally occurring or synthetic erionite, mordenite, faujasite, etc. that may or may not be previously converted to a hydrogen or ammonia form and reduced in soda content by virtue of an exchange reaction with various metal cations, including rare earth metal cations; (c) refractory inorganic oxides, including alumina, titanium dioxide, zinc oxide, magnesia, thoria, chromia, silica-alumina, alumina-titania, silica-zirconia, alumina-chromia, etc. and (d) mixtures of one or more of the materials referred to above.

Refractory inorganic oxide materials are preferred catalyst support materials. In general, superior results are obtained when alumina, in particular the gamma or eta forms, is employed. Alumina is the preferred catalyst support material when the catalyst is employed in naphtha reforming operations. The support materials described above are known articles of commerce and can be prepared for use as catalyst constituents by many varied techniques. Typically, the support materials are prepared in the form of spheres, granules, powders, extrudates or pellets. The precise size or shape of the support material used is dependent upon many engineering factors not within the purview of the instant invention.

As noted above, the regeneration process of the instant invention is particularly adapted to the treatment of deactivated iridium-containing catalysts. Iridium may be the sole catalyst metal present on the support; however, iridium may also be used in combination with other Group VIII metals or metals from Groups IB, VIA or VIIA of the Periodic Table of the Elements. More specifically, the iridium may be used in conjunction with one or more additional catalyst metals selected from copper, silver, gold, iron, cobalt, nickel, tungsten, molybdenum, chromium platinum, palladium, rhodium, ruthenium, osmium, manganese or rhenium. The catalysts may also contain germanium, tin or lead. Particularly effective naphtha reforming catalysts are combinations of iridium and platinum. Most preferably, the catalyst metals are present in the form of highly dispersed clusters of atoms of said metals.

Certain minimum amounts of iridium, alone or in combination with additional catalyst metals, should be present on the catalyst. This is particularly true with respect to catalysts employed in a naphtha reforming operation where the catalyst should contain greater than about 0.1 wt. % iridium, based upon the dry weight of the total catalyst. For other types of operations, lesser quantities of iridium may be employed. Specifically, iridium may be present on the catalyst in amounts varying from about 0.01 to about 3.0 wt. %, preferably in amounts varying from about 0.1 to about 1.0 wt. %, based upon the total weight of the dry catalyst. Typically, any additional catalyst metals, such as platinum, are present in the catalyst in amounts varying from about 0.01 to 3.0 wt. %, preferably 0.1 to 1.0 wt. %, based upon the dry weight of the catalyst. Iridium/platinum naphtha reforming catalysts having maximum effectiveness normally contain 0.15 to 1.0 wt. % each, preferably about 0.15 to 0.5 wt. % each, of iridium and platinum, based on total catalyst.

Iridium-containing catalysts may be prepared employing simple impregnation techniques. Such a catalyst may be prepared by impregnating a support material with a solution of a soluble iridium compound and soluble compounds of any additional metals to be incorporated in the catalyst. Generally, an aqueous solution of the metal compounds is used. In the case of multimetallic systems, the support material may be impregnated with the various metal-containing compounds either sequentially or simultaneously. However, it is highly desirable that the metal compounds, in the case of a polymetallic system, be impregnated on the catalyst support simultaneously to maximize the desired interaction between the metal components and thereby promote the formation of a highly dispersed polymetallic cluster structure in the final reduced form of the catalyst. The carrier material is impregnated with solutions of appropriate concentration to provide the desired quantity of metal in the finished catalyst. In the case of iridium-containing catalysts, compounds suitable for the impregnation of iridium onto the carrier include, among others, chloroiridic acid, iridium tribromide, iridium trichloride, and ammonium chloroiridate. Additional catalyst metals may be incorporated onto the support by employing compounds such as chloroplatinic acid, ammonium chloroplatinate, platinum amine salts, perrhenic acid, ruthenium trichloride, rhodium trichloride, rhodium nitrate, palladium chloride, palladium amine salts, osmium trichloride, chloroosmic acid, auric chloride, chloroauric acid, silver nitrate, copper nitrate, copper chloride, ferric nitrate, cobalt nitrate, nickel nitrate, etc. The preferred catalyst manufacturing technique involves contacting a previously prepared support, such as alumina, with an aqueous solution of an iridium compound, alone or in combination with a compound of at least one additional catalyst metal.

After impregnation of the carrier, the composite catalyst is dried at a temperature varying from about 100° to 120°C. The catalyst may be dried in air at the above stated temperatures or may be dried by treating the catalyst in a flowing stream of inert gas or hydrogen. The drying step may be followed by an additional calcination step at temperatures of about 260°C. Care must be taken to avoid contacting the catalyst at elevated temperatures with air or other gases of high oxygen concentration. If the catalyst is contacted with oxygen at too high a temperature, at least a portion of the iridium present will be oxidized, with loss of surface area, to crystallites of iridium oxide. In the case of polymetallic systems, the desired polymetallic cluster structure will not be obtained on reduction.

Additional materials may be added to the iridium-containing catalyst composite to assist in the promotion of various types of hydrocarbon conversion reactions for which the catalyst might be employed. For example, the naphtha reforming activity of the catalyst is enhanced markedly by the addition of a halogen moiety, particularly a chlorine or fluorine moiety, to the catalyst. The halogen should be present in the catalyst in amounts varying from about 0.1 to about 3.0 wt. %, based on the total dry weight of the catalyst. The halogen may be incorporated into the catalyst at any suitable stage in the catalyst manufacturing operation, i.e., before, during or after incorporation of the active metal component onto the support material. Halogen is often incorporated into the catalyst by impregnating the support with halogen-bearing metal compounds such as chloroiridic acid. Further amounts of halogen may be incorporated in the catalyst by contacting it with hydrogen fluoride, ammonium fluoride, hydrogen chloride, or ammonium chloride, either prior to or subsequent to the impregnation step. Other components may also be added to the catalyst composite. For example, the catalyst may be sulfided before or during use. For certain applications other than naphtha reforming, alkali or alkaline earth metal compounds may be added to the catalyst.

The iridium-containing catalyst composites may be used to promote a wide variety of hydrocarbon conversion reactions such as hydrocracking, isomerization, dehydrogenation, hydrogenation, alkylation, polymerization, cracking, and the like. The catalysts are particularly useful in promoting the dehydrogenation, isomerization, dehydrocyclization and hydrocracking reactions that occur in a naphtha hydroforming process.

In a naphtha hydroforming process (reforming) a substantially sulfur-free naphtha stream that typically contains about 15 to 80 volume % paraffins, 15 to 80 volume % naphthenes and about 2 to 20% aromatics and boiling at atmospheric pressure substantially between about 25° and 230°C., preferably between about 65° and 190°C., is contacted with the iridium containing catalyst composite in the presence of hydrogen. The reactions typically occur in a vapor phase at a temperature varying from about 340° to 540°C., preferably about 400° – 530°C. Reaction zone pressures may vary from about 1 to 50, preferably from about 5 to 30 atmospheres. The naphtha feed stream is passed over the catalyst composite at space velocities varying from about 0.5 to 20 parts by weight of naphtha per hour per part by weight of catalyst (W/hr./W), preferably from about 1 to 10 W/hr./W. The hydrogen to hydrocarbon mole ratio within the reaction zone is maintained between about 0.5 and 20, preferably between about 1 and 10. During the reforming process, the hydrogen used may be in admixture with light gaseous hydrocarbons. In a typical operation, the catalyst is maintained as a fixed bed within a series of adiabatically operated reactors. The product stream from each reactor (except the last) in the reactor train is reheated prior to passage to the following reactor. As an alternate to the above-described process, the catalyst may be used in a moving bed in which the naphtha charge stock, hydrogen and catalyst are passed in parallel through the reactor or in a fluidized system wherein the naphtha feed stock is passed upwardly through a turbulent bed of finely divided catalyst particles. Finally, if desired, the catalyst may be simply slurried with the charge stock and the resulting mixture conveyed to the reaction zone for further reaction.

Regardless of the hydrocarbon conversion reaction in which iridium-containing catalyst composites are employed, the catalyst tends to deactivate after use due at least in part to the formation of coke or carbonaceous residues on the surface of the catalyst. The carbonaceous residues on the surface of the catalyst cover the active catalyst sites and thus decrease activity. Accordingly, it becomes necessary to remove the carbonaceous deposits from the catalyst in order to return the catalyst to an economically viable activity level.

The first step in the regeneration sequence of the present invention consists of treating the catalyst with oxygen in controlled amounts to burn at least a portion of the carbonaceous deposits which accumulate on the catalyst during use. This burning operation is carried out at a temperature of at least 300°C., preferably between 300° to 600°C. and, most preferably, between 340° to 490°C. In a most preferred operation, the coke residue is removed from the catalyst by contacting the same with oxygen contained in minor concentrations in an inert gas, normally flue gas, so as to maintain a flame front temperature of less than about 460°C., preferably less than about 430°C. Oxygen concentrations in the burning gas are maintained typically between 0.1 – 0.5 mole % in order to maintain this relatively low flame front temperature. Following completion of the low temperature burn, the catalyst may undergo a low temperature aftertreatment operation at temperatures varying from about 340°– 460°C. with a burning gas containing oxygen in a concentration of from about 0.3 – 21 mole %, preferably between 1 – 6 mole %.

Following the burning operation, it is highly desirable that the carbonaceous residue depleted catalyst be contacted with an inert gas, preferably nitrogen, to remove from the reaction zone any carbon monoxide, carbon dioxide and oxygen remaining after the burning operation. Desirably, the purge operation is conducted at temperatures of less than about 400°C., preferably at less than about 350°C. The purging operation can be accomplished by a continuous purge sweep or by evacuating the reaction zone containing the catalyst and then pressurizing the chamber with nitrogen. Alternatively, the zone may be pressurized with nitrogen and then depressurized.

Following the purging operation, if used, the catalyst is subjected to a plurality of reduction/chlorination cycles in order to redisperse the iridium catalyst components, that is to increase the iridium surface area of the catalyst to a level greater than about 200 m$^2$/gm. This surface area level corresponds to an iridium particle size (length of a side of an assumed cubic crystallite) of less than about 11A.

The reduction step is accomplished by contacting the carbonaceous residue depleted catalyst with a hydrogen-containing gas at a temperature between about 200° – 550°C., preferably between about 350° to 550°C. Preferably, the hydrogen-containing gas comprises hydrogen contained in nitrogen and is substantially free of sulfur or other catalyst poisons such as phosphorous compounds. The contacting of the catalyst with the hydrogen-containing gas is carried out for a time sufficient to convert at least a portion, preferably a substantial portion, of the iridium contained in the catalyst to its metallic or elemental form. The pressure within the contacting zone during the time of hydrogen treatment may vary from about 0.1 to 30, preferably 5 to 20, atmospheres. If a purge step is used following the carbonaceous residue burning operation, the hydrogen-containing gas is introduced into the reaction zone while the catalyst is at the relatively low temperatures used in the purging operation. Thereafter, the catalyst temperature is raised to the level desired in the halogenation step by contact with high temperature hydrogen-containing gas.

Following the reduction operation, the catalyst which has a substantial portion of the iridium contained thereon in the metallic (elemental) form is contacted with an elemental halogen-containing gas, preferably a chlorine-containing gas at a temperature of at least about 300°C. Preferably, the contacting of the catalyst with the halogen-containing gas is conducted at a temperature varying from about 300° – 600°C. Most preferably, the temperature of contacting with the haolgen-containing gas is carried out at a temperature varying from 470° – 550°C. There is no necessity for cooling the catalyst between the reduction and halogenation steps. It is preferred that the plurality of reduction/halogenation cycles needed to redisperse the iridium catalyst component be completed without reducing the temperature of the catalyst below about 300°C. The reaction zone pressure during the halogenation operation is preferably maintained between about 0.1 to 30 atmospheres, preferably between about 5 to 20 atmospheres. Desirably the halogen employed in the treating operation is used in admixture with an inert gas, preferably nitrogen. Most preferably, the concentration of the halogen in the treating gas mixture is relatively low, that is, the halogen comprises from about 0.005 to 5% by volume of the gaseous mixture with about 0.02 to 1.0% by volume being the most preferred concentration. The contacting of the catalyst with the halogen-containing gas is generally continued for a time sufficient to incorporate from 0.1 to 4.0 wt. %, preferably from 0.5 to 2.0 wt. %, additional halogen onto the catalyst, based upon the anhydrous weight of the catalyst. Generally, from a corrosion standpoint, it is desirable not to continue the halogen treating operation substantially beyond the point where chlorine is detected in the gases issuing from the zone containing the catalyst in concentrations approximating the halogen concentration of the inlet gases. It should be recognized that while elemental halogen, preferably chlorine or fluorine and, most preferably, chlorine, is a necessary constituent of the treating gas that other materials may be present in the treating gas mixture. For example, the treating gas may contain water, hydrogen halides, oxygen, and the like. The required halogen may be injected into the reaction zone containing the catalyst as such or may be generated in situ by the thermal or oxidative degradation of materials containing halogen. For example, chlorine may be generated by the in situ oxidation of hydrogen chloride. similarly, chlorine can be generated by the thermal and/or oxidative degradation of $C_1$ - C4 chlorinated hydrocarbons such as carbon tetrachloride, trichloroethylene, ethylene dichloride, t-butyl chloride, etc.

As noted above, the halogen-containing treating gas may contain water and/or oxygen; however, the concentration of oxygen and/or water in the halogen-containing treating gas should be carefully controlled. The molar ratio of oxygen to elemental halogen in the treating gas should be maintained below about 10:1. Preferably, equal molar quantities of oxygen and halogen or a molar excess of halogen (oxygen to halogen molar ratio of 1:1 or less) is used in the treating operation. The presence of water in the chlorine-containing treating gas is beneficial since its presence serves to reduce corrosion and aids in the distribution of the halogen through the catalyst bed being treated. However, the presence of excessive amounts of water in the treating gas serves to unnecessarily wet the catalyst and possibly strip halogen from the catalyst. Preferably, the water concentration of the treating gas is maintained at levels ranging from about 0.005 to 10.0%, preferably 0.02 to 1.0% by volume of the total treating gas.

After completion of the initial hydrogen reduction/halogen treating steps following removal of carbonaceous residues, the catalyst is again subjected to additional reduction/halogen treating cycles. Generally from 1 to 6 additional cycles are used in order to completely convert the iridium present in the catalyst to a metallic surface area greater than about 200 m²/gm. Because of the tendency of iridium to agglomerate into low surface area clusters, the use of multiple reduction/chlorine treating cycles following carbonaceous residue removal is normally necessary to secure substantially complete redispersion of the iridium contained on the catalyst.

The regeneration process of the present invention is generally carried out in situ, that is, the catalyst being treated is maintained within the reactor vessels in which the hydrocarbon conversion reactions are carried out. However, the catalyst may be regenerated in a separate reaction zone. Typically, the regeneration sequence is started by discontinuing contacting the catalyst with feed stock and the reaction vessels purged of feed stock using techniques well known to those skilled in the art. Thereafter, nitrogen is circulated through the reactors at elevated temperature and oxygen slowly introduced into the circulating nitrogen stream in order to burn carbonaceous residues from the catalyst. As previously described, oxygen, carbon monoxide and carbon dioxide are purged thereafter from the system and hydrogen is introduced into the circulating nitrogen gas stream. After the iridium present on the catalyst has been substantially reduced to elemental iridium through contact with hydrogen, the introduction of hydrogen into the circulating nitrogen gas is discontinued and elemental chlorine introduced into the circulating stream. Initially the chlorine reacts with the minor amounts of hydrogen remaining in the circulating stream to form hydrogen chloride. After the remaining hydrogen is consumed, the catalyst comes in contact with elemental chlorine. Oxygen and/or water may be introduced into the circulating chlorine-containing gas. If desired, the hydrogen may be purged from the reaction zone by passing an inert gas through the reaction zone prior to the introduction of the elemental halogen. Following the initial chlorine treat, the reduction/chlorination sequence is repeated at least one additional time, generally from two to three additional times, in order to completely redisperse the iridium present in the catalyst. Desirably, the elemental halogen is purged from the reaction zone using an inert purge gas prior to the reintroduction of the hydrogen-containing gas.

It is preferred that the various steps of the regeneration process following the initial reduction operation be completed and the catalyst returned to use without contacting the catalyst with a substantially halogen-free, oxygencontaining gas at a temperature sufficient to agglomerate further the iridium on the catalyst, e.g., above 370°–415°C. High temperature oxygen contacting during the course of the regeneration procedure may diminish the effectiveness of the operation by further agglomerating the iridium on the catalyst. It is preferred that the steps of the regeneration procedure be carried out in sequence. However, the catalyst may be subjected to various other treating operations during or between the reduction/halogenation steps of the regeneration procedure. Such treating operations should not convert any substantial portion of the iridium to a crystalline oxide form or otherwise convert any substantial portion of the iridium and/or support to a state that would preclude the successful regeneration of the catalyst following the procedures hereof.

Another preferred embodiment of the present invention involves reversing the direction of flow of the halogen-containing gas with each reduction/halogenation cycle. For example, in the first reduction/chlorination cycle, the halogen-containing treat gas may be introduced into the top of each reactor containing the catalyst and passed downwardly over the catalyst. In the second cycle the halogen-containing gas is introduced into each reactor at the bottom thereof and passed upwardly over the catalyst. In the third cycle, halogen reagent is again introduced into the top of each reactor. Utilizing this mode of operation, substantially complete redispersion of the iridium is accomplished with a lesser number of cycles than where the flow direction of the treating gases is maintained constant with each cycle.

Following the final contacting of the catalyst with chlorine-containing gas, the catalyst is treated with hydrogen and returned to use without further contact with a halogen-free, oxygen-containing gas at a temperature in excess of about 370° to 415°C. Prior to use, the catalyst is contacted with a gaseous reagent, preferably hydrogen or nitrogen that contains a minor amount of hydrogen sulfide or other sulfur donor, at a temperature ranging from 350° to about 425°C. in order to sulfide the catalyst. The sulfiding operation is normally carried out for a time sufficient to add from 0.3 to 0.15 wt. % sulfur on the catalyst, based upon the dry weight of the catalyst.

DESCRIPTION OF THE PREFERRED EMBODIMENTS

The following examples illustrate further the regeneration process of the present invention.

EXAMPLE 1

Regeneration of Iridium on Alumina Catalysts

A 1% by weight iridium on alumina catalyst was prepared by taking 99 gms. of eta alumina and mixing it with 10 milliliters of an aqueous solution of chloroiridic acid, the latter containing 0.1 gm. of iridium per ml. of solution. The catalyst was then dried in air at 110°C. for 16 hours. About 5 gms. of the dried catalyst were then charged to a Pyrex glass flow cell, the air removed from the cell, and pure hydrogen passed through it at 500 ml./minute. The sample was then heated from room temperature to 500°C. in the flowing hydrogen, and held at 500°C. for 1.25 hours. Full details of the apparatus and procedures used can be found in the published literature (D. J. C. Yates, W. F. Taylor and J. H. Sinfelt, *J. Am. Chem. Soc.*, 86, 2996, 1964 and D. J. C. Yates and J. H. Sinfelt, *J. Catalysis*, 8, 348, 1967).

After the reduction described above, the hydrogen was removed from the catalyst by evacuation with high vacuum at 500°C. The sample was then cooled to room temperature under vacuum, and two carbon monoxide isotherms measured at 20°C., using the procedures given in the 1967 article mentioned above. The particle size of the iridium, calculated from the amount of CO chemisorbed, was found to be 15A or 180 square meters per gram of iridium ($m^2/gm$. Ir). This indicates that the iridium was not fully dispersed, as the equivalent particle size for atomically dispersed iridium is 11.2A (238 $m^2/gm$. Ir).

The catalyst was then oxidized in situ in its Pyrex cell by adding pure oxygen at a pressure of 5 cm Hg, heating from room temperature to 500°C., then held at 500°C., for 2 hours. The sample was then cooled to room temperature, reduced in hydrogen at 500°C. and carbon monoxide isotherms run in a fashion identical with that used in the first treatment. The particle size of the iridium was now found to be 50A (53 $m^2/gm$. Ir); this is a large decrease in dispersion levels, and indicates the sensitivity of this catalyst to oxygen at elevated temperatures (Treatment 2, FIG. 1).

The third treatment of this catalyst, also in situ in the Pyrex cell, consisted of heating the catalyst from room temperature to 500°C. in a flowing gas containing 1% $Cl_2$, 1% $O_2$, 98% He and holding at 500°C. in the presence of the gas mixture for 3 hours. After reduction and CO isotherms as in the first treatment, the iridium had a particle size of 11A, equivalent to atomically dispersed metal (i.e., every metal atom is on the surface of the support and accessible for catalytic reactions). It is interesting that in addition to undoing the damage done by oxygen in treatment 2, this chlorine treatment gave a better dispersion of the iridium than was present in the fresh catalyst (Treatment 3, FIG. 1).

The fourth and fifth treatments consisted of two oxidations at 500°C., the first with 1% $O_2$ in He (Treatment 4), followed by oxidation in air at 500°C. (Treatment 5). The iridium after this treatment was now at a very low level of dispersion, the particle size being 87A (31 $m^2/gm$. Ir), an undesirable state of affairs. A second chlorine treatment under identical conditions to those used the first time now redispersed the iridium to 13A (198 $m^2/gm$. Ir) (Treatment 6, FIG. 1).

The well dispersed catalyst was then passivated and discharged from the vacuum cell. Two grams were then charged into a metal high pressure reactor for heptane reforming studies. The catalyst then behaved in a manner typical of that which is well known to be characteristic of a highly dispersed iridium on alumina catalyst, i.e., there was a high overall conversion and a high initial methane make (see Table I for details). After discharge from the reactor, considerable carbon was seen on the exterior of the catalyst.

The sample was then re-charged to the Pyrex glass cell, and the carbon burned off the catalyst in a two-step treatment. The first involved slowly heating the catalyst to 500°C. in a flow of nitrogen containing 1% oxygen. After reaching 500°C., the oxygen concentration was increased to 20% by the use of dry air, and the sample held under these conditions for 1 hour. All visible carbon was removed by this treatment. After reduction, CO isotherms showed an iridium particle size of 77A (35 $m^2/gm$. Ir) (Treatment 7, FIG. 1).

The catalyst was taken out of the vacuum cell again, and put in the high pressure metal reactor for a second time. The sample then showed (see Table I) low conversion of heptane and a low methane make--both being characteristics of an inactive catalyst having poorly dispersed metal. Little carbon was seen on discharging the catalyst, consistent with its low activity.

To demonstrate the ability of the redispersion technique of this instant invention to achieve multiple regenerations, the sample was again charged to the vacuum system and the whole cycle repeated. That is, the carbon was burned off, sample reduced, then chlorine treated in the identical fashion to that used before. On placing the catalyst in the reactor for the third time, it was again found to be catalytically identical to a fresh iridium catalyst containing very well dispersed iridium (see Table I).

TABLE I

| Treatment No. (See Figure 1) | Correlation Between Iridium Dispersion and Catalytic Activity for Heptane Conversion | | | |
|---|---|---|---|---|
| | Particle Size of Ir (A) | Catalytic Activity | | |
| | | Conversion % | $C_1$ and $C_2$ Yield % | Total Aromatic % |
| 6 | 13 | 66 | 63 | 8.6 |
| 7 | 77 | 25 | 4 | 5.6 |
| 8 | Not measured | 83 | 52 | 8.9 |

The catalytic data above were obtained 165 minutes after the feed was brought in contact with the catalyst. All values are given in mole % of feed. The reaction conditions were 454°C.; hydrogen:hydrocarbon ratio 5:1; liquid hourly space rate 20 w/hr/w; and 200 p.s.i.g. total pressure.

EXAMPLE 2

Figure 2:
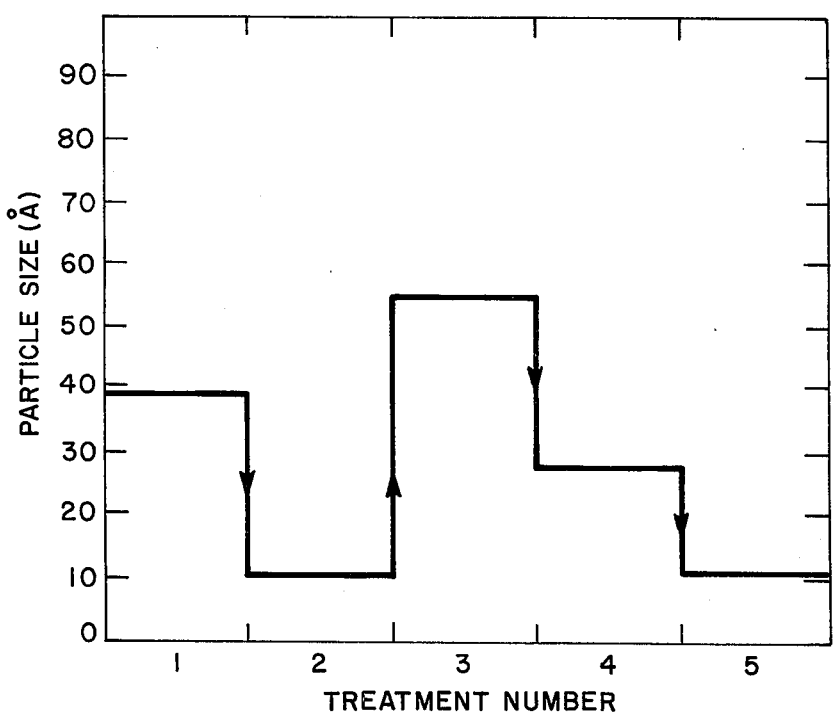

Regeneration of Iridium on Alumina with Chlorine in Air vs. Chlorine and Low Amounts of Oxygen Another sample was taken of the catalyst used in Example 1, and reduced as in that example. The catalyst was then oxidized in situ in its glass adsorption cell with flowing air at 500°C. for 2 hours. After re-reduction in hydrogen, and running the carbon monoxide isotherms, it was found that the iridium had grown to 39A (69 m²/gm. Ir) (Treatment 1, FIG. 2).

After a chlorine treatment consisting of heating the catalyst from room temperature to 500°C. in the presence of a gas mixture composed of 1% $Cl_2$, 1% $O_2$, 98% He and then contacting the catalyst with the gas mixture at 500°C. for 2 hours, it was found that the iridium had been completely redispersed (Treatment 2).

The catalyst was again oxidized as in Treatment 1, and it was found that the iridium particles had grown to 55A (49 m$^w$/gm. Ir). The sample was then chlorine treated, after hydrogen reduction, as in Treatment 2 except that the gas mixture was 1% chlorine in air, and the time of treatment at 500°C. (holding period) was for 3 hours (Treatment 4). Some redispersion of the iridium was achieved, as the particle size was reduced from 55A to 28A (96 m²/gm. Ir), but this is substantially less than the atomic dispersion level which is necessary for maximum catalytic activity.

Finally, the sample was again treated with chlorine, after hydrogen reduction, as in Treatment 2 above, the original mixture now being used (1% $Cl_2$, 1% $O_2$, 98% He), at 500°C. for 3 hours. Again, atomic dispersion was readily achieved with the use of low oxygen concentrations, as taught by this instant invension (Treatment 5).

EXAMPLE 3

Regeneration of Iridium:Platinum on Alumina Catalysts

In this and the following experiments, a 0.3% iridium, 0.3% platinum, by weight, on alumina catalyst was utilized. A typical preparative procedure includes contacting 100 gms. of gamma alumina (in the form of 1/16 inch extrudates) with a solution containing both iridium and platinum salts. The latter is prepared by taking 150 ml. of distilled water and adding to it 3 ml. of a chloroiridic acid solution containing 0.1 gm. of iridium per ml. of solution and 3 ml. of a chloroplatinic acid solution containing 0.1 gm. of platinum per ml. of solution. The alumina is added to the above solution and left for several hours at room temperature. After removing the excess water, the catalyst is dried in air at 110°C. for 16 hours, then at 250°C. for 3 hours. This is catalyst 3(A).

Five grams of this catalyst were charged to the apparatus as used in Example 1, and reduced in hydrogen for 1 hour at 500°C. After CO chemisorption isotherms had been run, it was found that both metals were fully dispersed, as every metal atom was in the surface (equivalent particle size is 11.6A, for a 50%, 50% mixture of Ir + Pt).

A second catalyst 3(B) was prepared as follows. Fifty grams of catalyst 3(A) were charged to a furnace and heated in air at 760°C. for 48 hours. This experiment simulates temperatures which might be obtained if the temperature became out of control during the process of removing the carbon from catalysts deactivated by use under reforming conditions.

Five grams of 3(B) were then charged to the adsorption apparatus, and reduced as detailed above for catalyst 3(A). Very much less carbon monoxide was found to be adsorbed, and the average metal particle size was found to be 300A (9 m²/gm. Ir).

In the case of bi- or multi-metallic catalysts of this type, chemisorption measurements using gases which are adsorbed on all the metals used, can only give an average metal particle size. To obtain information about the particle size of individual metals, the only method available is to use X-ray diffraction techniques (see Yates et al, supra).

When catalysts containing very small amounts of metal are used, for example, catalysts 3(A) and 3(B), different techniques than normal have to be employed, especially if the support material has an X-ray spectrum. This is the case with the alumina used here. The X-ray technique developed for this work is to first run the spectrum of the catalyst, for example, catalyst 3(B), after reduction with hydrogen. Then a portion of the same alumina used to prepare catalyst 3(A) was taken, and heated in air for 48 hours at 760°C., in a fashion identical to that used in preparing sample 3(B). The X-ray spectra of this calcined alumina was then run, using identical scanning procedures as those used with the reduced catalyst 3(B). These comprised recording in steps of 0.05° in 2θ over the values of 51° to 12° of 2θ, counting at 80 sec. at each position to ensure good signal to noise ratios. The data were collected in digital form, and the two spectra were subtracted using a computer. Scaling was carried out, if needed, in regions of the spectra remote from the metal peaks. This final subtraction gives the spectra of the metals alone, the peaks due to the alumina having been cancelled out by this procedure.

Data obtained in this way with copper Kα radiation on a reduced sample of catalyst 3(B) show separate, discrete peaks for platinum at 39.8 2θ, and for iridium at 40.6 2θ, corresponding to the 111 planes. The particle size of the Pt was 620A and of the Ir 340A. The agreement with the chemisorption value (average 300A) is reasonable considering the errors in both methods with these very large particles. The errors in chemisorption methods are least when the metal is fully dispersed, and become higher as the particle size increases. With X-rays, particles of less than 50A give peaks too broad to be measurable, and as soon as the peaks are measurable, the optimum accuracy is obtained. Above about 300A, the peaks gradually become so narrow as to be indistinguishable from lines of the bulk metals, and this again decreases the accuracy.

The process of redispersion, when part of the metal is in the atomic state, and some, say, in the 300A state can thus only be followed with X-ray techniques by measuring the amount of large particle size material remaining, as the metal with particle size below about 50A cannot be detected in the X-ray spectrum.

EXAMPLE 4

Regeneration of iridium:Platinum Catalyst

A 5 gm. aliquot of catalyst 3(B) was charged to the Pyrex cell, and reduced in hydrogen at 500°C. It was then treated by heating from room temperature to 500°C. in the presence of a flowing gas of composition 1% $Cl_2$, 1% $O_2$, 98% $N_2$ and held at 500°C. in the presence of the flowing gas for 6 hours. Examination by differential X-ray spectroscopy, by the method given in Example 3, showed 5% of the platinum in crystals larger than 50A, and 45% of the iridium in large crystals. The data from chemisorption can be put into a form to give the percentage of large iridium by assuming that all of the platinum is well dispersed. This is a good assumption here. The chemisorption data then show 27% of the iridium to be in the form of large crystals.

EXAMPLE 5

Effects of Pre-Reduction on Regeneration of Iridium:Platinum Catalysts

To show that the pre-reduction step is critical in the resispersion of iridium, which is an unexpected discovery to one familiar with the previous art in this field, the following experiment was performed. The procedure of Example 4 was followed, except that the pre-reduction step was omitted.

X-ray data (obtained as in Example 3) showed that 0% of big platinum was present and 100% of the iridium was present as large crystals. Chemisorption data support this, as the amount of gas adsorbed corresponded to about half of the metal in the sample being of large particle size. It should be noted that this experiment redispersed the platinum with good efficiency, showing that the pre-reduction step is not critical with this metal, and in addition showing the relative ease and non-criticality of processes designed to redisperse only platinum.

EXAMPLE 6

Effects of Multiple Treatments on the Regneration of Iridium:Platinum Catalysts As a further illustration of the beneficial effects of pre-reduction, dramatically demonstrated in the previous example, the following experiment was performed. The procedure given in Example 4 was followed, except that the treatment with 1% $Cl_2$, 1% $O_2$, 98% $N_2$ was at 500°C. for a holding period of 3 hours. Chemisorption data were obtained after this step, and indicated an overall dispersion of both metals to be 64%. If all of the platinum is resispersed, which commonly takes place with sample 3(B) whatever the nature of the chlorine treatment, this corresponds to 72% of the iridium still being left as large crystals. However, this assumption was not verified by X-ray studies after this 3 hour treatment, as it was desired to carry out a second treatment without exposing the catalyst to air.

The sample was then given a second chlorine treatment, after hydrogen reduction, identical with the first, i.e., 3 hour holding period at 500°C. After this, the chemisorption data showed that, within limits of error, all of the platinum and iridium was in atomic dispersion, i.e., the effective particle size was 11.6A. X-ray spectra, obtained as in Example 3, showed no large platinum crystals and 12% large iridium crystals.

Comparison with Example 4, where one pre-reduction was followed by a single 6-hour chlorine treatment, will show the superiority of the method of this example. In this case, a six hour chlorine treatment was also given, but it was stopped after the first three hours, the sample reduced again, cooled to room temperature and a second three hour treatment given. In Example 4, after one 6 hour treatment, between 27 and 45% of the iridium was still in the form of large crystals, as determined by two experimental methods. In marked contrast, the present example, using two 3 hour treatments, (each preceded by a reduction step) resulted in very little large iridium being detected by either method.

EXAMPLE 7

Effect of Multiple Reduction-Chlorination Cycles on the Regeneration of Iridium:Platinum on Alumina Catalyst Another example of multiple reduction-halogenation treatments was conducted on a larger scale using 100 gram samples of catalyst. The experiments were conducted in a 1 inch diameter silica glass tubular reactor, 36 inches long, at atmospheric pressure. The catalyst used in the test was taken from batch designated as catalyst 3(A) in Example 3 and was pretreated by heating in air at about 540°C. for 16 hours. This catalyst is hereinafter designated as catalyst 7(A). After this treatment, none of the platinum on the catalyst was in a particle size range detectable by X-ray diffraction (see description given in Example 3). All of the iridium on the catalyst was present in large particles (greater than 50A).

In the first experiment, 75 grams of catalyst 7(A) were maintained as a single bed within the reactor and treated using the following sequence of steps:

1. The catalyst was heated from room temperature to about 500°C. in hydrogen and maintained in the hydrogen atmosphere at 500°C. overnight.
2. Hydrogen flow was halted and hydrogen purged from the reaction zone by passing helium therethrough at 500°C.
3. A treating gas comprising 1 volume % chlorine, 1 volume % oxygen in nitrogen was passed over the catalyst at 500°C. The treatment was continued for 1 hour past the point when chlorine was first detected in the exit of the catalyst bed.
4. The chlorine-containing treat gas was purged from the system by passing helium through the reactor at 500°C.
5. Hydrogen contained in helium was then passed through the reaction zone for a period until hydrogen was detected in the exit gases. This reduction was conducted at 500°C.
6. Hydrogen flow was halted and hydrogen was purged from the reaction zone by flowing helium therethrough at 500°C.
7. Same as step (3).
8. Same as step (4).
9. Same as step (5).
10. Same as step (6).
11. Same as step (3).
12. The chlorine-containing treat gas was purged from the system by passing helium through the reactor at 500°C. After the purge period was completed, the catalyst was cooled to room temperature in helium.

X-ray diffraction analysis of a 1-gram sample of the treated catalyst revealed that the catalyst contained 19% of the iridium in crystallites of greater than about 50A. Originally the catalyst contained 100% of the iridium as large crystals. In other words, 81% of the iridium was redispersed into small particles following the procedure of the present invention.

A second comparative experiment was conducted in which 75 grams of catalyst 7(A) were charged to the same reactor employed in the first experiment and treated with chlorine in the following sequence of steps. The catalyst was maintained within the reactor in two discrete beds of 37.5 grams each.

I. Same as step (1) of the first experiment.
II. Same as step (2) of the first experiment.
III. Same as step (3) of the first experiment.
IV. The catalyst was purged as in step (4) of the first experiment; however, the duration of the purge was equal to the elapsed time of steps (4), (5) and (6% of the first experiment. In other words, the purge of this step IV was carried out as long as the two purges and reduction step of the first experiment, steps (4), (5) and (6).
V. Same as step (7) of the first experiment.
VI. Same as step IV (corresponds to steps (8), (9), and (10) of the first experiment).
VII. Same as step (11) of the first experiment.
VIII. Similar to step (12) of the first experiment wherein the catalyst was purged and cooled to room temperature in helium.

X-ray diffraction analysis of a sample of the inlet bed showed that 42% of the iridium was present as large (greater than 50A) particles. An analysis of the catalyst contained in the exit bed revealed that 70% of the iridium was present as large particles. The average large particle iridium present in both beds is 56%. Expressed another way, the average overall redispersion of the iridium present in the catalyst was about 44%. Comparing this result with the results of the first experiment reveals that using reduction steps intermediate to the chlorine treatment steps results in a process that is nearly twice as efficient for iridium redispersion as an operation conducted without the intermediate reduction steps.

What is claimed is:

1. In a process for the catalytic reforming of hydrocarbons wherein a hydrocarbon feed stock is contacted with a catalyst comprising from about 0.01 to about 3.0 wt. % of an iridium component and a halogen component contained in an inorganic refractory oxide support at reforming conditions, the catalyst having been at least partially deactivated during contact with said feed stock by the depositing of carbonaceous residues, a method for regenerating said catalyst after discontinuing contact of said catalyst with said feed stock comprising:
   1. contacting said catalyst in a reaction zone with a gaseous mixture containing oxygen at an elevated temperature of less than about 600°C. for a time sufficient to burn at least a substantial portion of said carbonaceous residues from said catalyst;
   2. contacting said carbonaceous residue-depleted catalyst in said reaction zone with a hydrogen-containing gas at an elevated temperature for a time sufficient to convert a substantial portion of said iridium on said catalyst to its metallic form;
   3. contacting said treated catalyst having a substantial portion of the iridium contained thereon in the metallic form in said reaction zone with an elemental halogen-containing gas at a temperature of at least about 300°C. for a time sufficient to redisperse at least a portion of the iridium on the catalyst;
   4. contacting said halogen treated catalyst in said reaction zone with a hydrogen-containing gas at an elevated temperature for a time sufficient to convert a substantial portion of said iridium on said catalyst to its metallic form; and
   5. contacting said treated catalyst having a substantial portion of the iridium contained thereon in the metallic form in said reaction zone with a halogen-containing gas at a temperature of at least about 300°C. for a time sufficient to redisperse at least a portion of the iridium on the catalyst.

2. The process of claim 1 wherein, after completion of step (1), said catalyst is contacted with an inert purge gas for a time sufficient to remove substantially all of the carbon dioxide, carbon monoxide and oxygen present in said reaction zone.

3. The process of claim 1 wherein said steps (4) and (5) are repeated, in sequence, at least one additional time.

4. The process of claim 1 wherein said halogen containing gas employed in steps (3) and (5) is a chlorine containing gas.

5. The process of claim 1 wherein the direction of flow of said halogen-containing gas employed in step (5) is reversed from the direction of flow of said halogen-containing gas used in step (3).

6. In a process for the catalytic reforming of hydrocarbons wherein a hydrocarbon feed stock is contacted with a catalyst comprising from 0.01 to about 3.0 wt. % of an iridium component and chlorine component contained on an inorganic refractory oxide support at reforming conditions, the catalyst having been at least partially deactivated during contact with said feed stock by the deposition of carbonaceous residues, a method for regenerating said catalyst after discontinuing contact of said catalyst with said feed stock comprising:
   1. contacting said catalyst in a reaction zone with a gaseous mixture containing oxygen at an elevated temperature of less than about 600° C. for a time sufficient to burn at least a substantial portion of said carbonaceous residues from said catalyst;
   2. contacting said catalyst with an inert purge gas for a time sufficient to remove substantially all of the carbon dioxide, carbon monoxide and oxygen present in said reaction zone; p1 3. contacting said carbonaceous residue-depleted catalyst in said reaction zone with a hydrogen-containing gas at elevated temperature for a time sufficient to convert a substantial portion of said iridium on said catalyst to its metallic form;
   4. contacting said treated catalyst having a substantial portion of the iridium contained thereon in the metallic form in said reaction zone with an elemental chlorine-containing gas at a temperature of at least about 300°C. for a time sufficient to redisperse at least a portion of the iridium on the catalyst;
   5. contacting said chlorine treated catalyst in said reaction zone with a hydrogen-containing gas at an elevated temperature for a time sufficient to convert a substantial portion of said iridium on said catalyst to its metallic form; and
   6. contacting said treated catalyst having a substantial portion of the iridium contained thereon in the metallic form in said reaction zone with a chlorine-containing gas at a temperature of at least about 300°C. for a time sufficient to redisperse at least a portion of the iridium on the catalyst.

7. The process of claim 6 wherein said step (1) is contacted at a temperature varying between about 340° and 490°C.

8. The process of claim 6 wherein said steps (3) and (5) are conducted at a temperature varying from about 350° to 550°C.

9. The process of claim 6 wherein said steps (4) and (6) are conducted at a temperature varying from about 300° to 600°C.

10. The process of claim 6 wherein the contacting of steps (4) and (6) is continued for a time sufficient to introduce from about 0.1 – 4.0 wt. % additional chlorine into said catalyst.

11. The process of claim 6 wherein the chlorine containing gas of said steps (4) and (6) contains oxygen, the molar ratio of oxygen to elemental chlorine in said chlorine containing gas being less than about 10 : 1.

12. The process of claim 6 wherein said catalyst comprises, in addition to said iridium component, from about 0.01 to about 3.0 wt. % of a platinum component and from about 0.1 to about 3.0 wt. % of a chlorine component contained on an alumina support.

13. The process of claim 6 wherein, after steps (3) and (5) but prior to conducting steps (4) and (6), the catalyst is contacted with an inert purge gas for a time sufficient to remove substantially all of the hydrogen present in said reaction zone and, after step (4) but prior to conducting step (5), said catalyst is contacted with an inert purge gas for a time sufficient to remove substantially all of the chlorine-containing gas present in said reaction zone.

14. In a process for the catalytic reforming of hydrocarbons wherein a naphtha feed stock and hydrogen are contacted with a catalyst comprising at least about 0.1 wt. % of an iridium component and from about 0.01 to about 3.0 wt. % of a chlorine component contained on an inorganic refractory oxide support at reforming conditions, the catalyst having been at least partially deactivated during contact with said naphtha feed stock by the deposition of carbonaceous residues, a method for regenerating said catalyst after discontinuing contact of said catalyst with said naphtha feed stock comprising:

1. contacting said catalyst in a reaction zone with a gaseous mixture containing oxygen at a temperature varying from 340° and 490°C. for a time sufficient to burn at least a substantial portion of said carbonaceous residues from said catalyst;

2. contacting said catalyst with an inert purge gas at a temperature of less than about 400°C. for a time sufficient to remove substantially all of the carbon dioxide, carbon monoxide and oxygen present in said reaction zone;

3. contacting said carbonaceous residue-depleted catalyst in said reaction zone with a hydrogen-containing gas at a temperature varying from about 350° to 550°C. for a time sufficient to convert a substantial portion of said iridium on said catalyst to its metallic form;

4. contacting said treated catalyst having a substantial portion of the iridium contained thereon in the metallic form in said reaction zone with an elemental chlorine-containing gas at a temperature varying from about 470° and 550°C. for a time sufficient to redisperse at least a portion of the iridium on the catalyst;

5. contacting said chlorine treated catalyst in said reaction zone with a hydrogen-containing gas at a temperature varying from about 350° to 550°C. for a time sufficient to convert a substantial portion of said iridium on said catalyst to its metallic form; and 6. contacting said treated catalyst having a substantial portion of the iridium contained thereon in the metallic form in said reaction zone with a chlorine-containing gas at a temperature varying from about 470° and 550°C. for a time sufficient to redisperse at least a portion of the iridium on said catalyst.

15. The process of claim 14 wherein the contacting of steps (4) and (6) is continued for a time sufficient to introduce from about 0.1 to 4.0 wt. % additional chlorine into said catalyst.

16. The process of claim 14 wherein, after steps (3) and (5) but prior to conducting steps (4) and (6), the catalyst is contacted with an inert purge gas for a time sufficient to remove substantially all of the hydrogen present in said reaction zone and, after step (4) but prior to conducting step (5), said catalyst is contacted with an inert purge gas for a time sufficient to remove substantially all of the chlorine-containing gas present in said reaction zone.

17. The process of claim 12 wherein said steps (5) and (6) are repeated, in sequence, at least one additional time.

18. The process of claim 17 wherein said hydrogen containing gas is substantially removed from the reaction zone prior to each of said subsequent steps wherein said catalyst is contacted with a chlorine-containing gas and said chlorine-containing gas is substantially removed from said reaction zone prior to contacting said catalyst with said hydrogen-containing gas.

19. The process of claim 1 wherein the hydrocarbon reforming process is naphtha reforming.

20. The process of claim 6 wherein the hydrocarbon reforming process is naphtha reforming.

21. The process of claim 4 wherein steps (4) and (5) are repeated, in sequence, until such time as the surface area of the iridium metal present on the catalyst is at least 200m²/gm.

22. The process of claim 6 wherein steps (5) and (6) are repeated, in sequence, until such time as the surface area of the iridium metal present on the catalyst is at least 200m²/gm.

23. The process of claim 14 wherein said catalyst comprises, in addition to said iridium component and said chlorine component, from about 0.01 to about 3.0 wt. % of a platinum component.

24. The process of claim 23 wherein steps (5) and (6) are repeated, in sequence, until such time as the surface area of the iridium metal present on the catalyst is at least 200m²/gm.

* * * * *